Patented Apr. 29, 1930

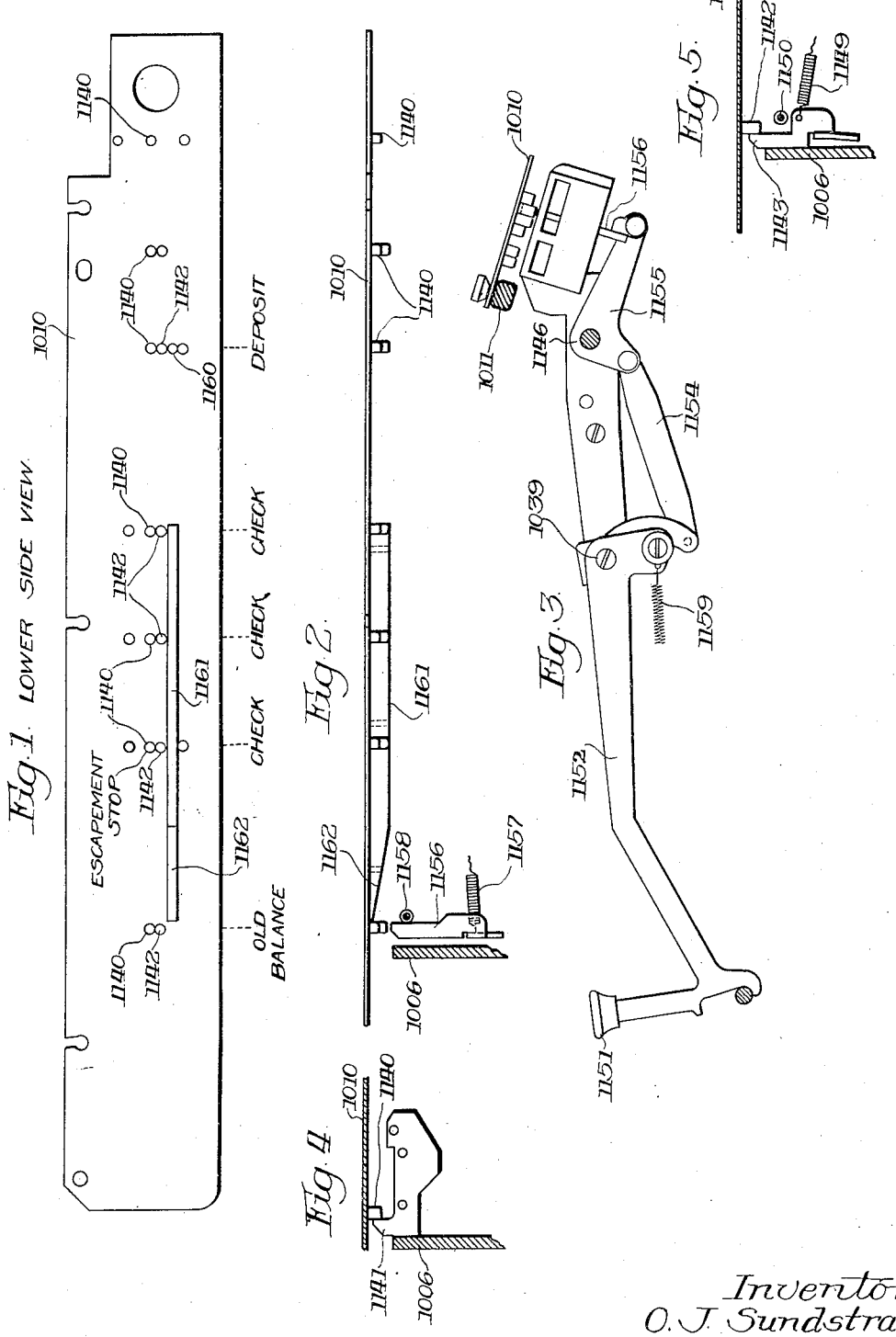

1,756,401

UNITED STATES PATENT OFFICE

OSCAR J. SUNDSTRAND, OF ROCKFORD, ILLINOIS, ASSIGNOR TO SUNDSTRAND CORPORATION, OF WILMINGTON, DELAWARE, A CORPORATION OF DELAWARE

TABULATOR

Application filed July 23, 1928. Serial No. 294,769.

Computing and printing machines adapted for making entries of the character required in bank bookkeeping are well known in the art. After picking up (i. e., printing and accumulating) the old balance, if there are no checks to be entered it is desirable to be able to cause the carriage to move directly to the position in which the deposit is to be added and printed.

The object of the present invention is to provide means whereby this result may be conveniently attained, it being understood that the invention also comprehends constructions adapted to permit of skipping any desired columns.

In the accompanying drawings:

Figure 1 is a lower side view of a stop plate comprised in a machine embodying the features of this invention.

Fig. 2 is a front edge view of the stop plate, the tabulator dog also being illustrated.

Fig. 3 is a view showing key mechanism comprised in the invention.

Fig. 4 is a front view of the escapement stop.

Fig. 5 is a front view of the escapement dog.

Reference may be had to my application Serial No. 118,628, filed June 26, 1926, which shows a computing and printing machine including a cross-tabulating carriage. A spring tends to move the carriage toward the left, as viewed in Fig. 2, and away from the observer in Fig. 3. The means for controlling the movement of the carriage from one columnar position to another includes an elongated stop plate 1010 pivoted to the rear portion of the carriage to swing on the axis 1011. For each position in which it is desired that the carriage halt there is provided on the stop plate 1010 a stop pin 1140 adapted to engage a stop lug 1141 (Fig. 4) stationarily located on the machine frame adjacent to an abutment 1006. In order to disengage the pin 1140 from the lug 1141 when the carriage is to be moved to the next position, I place on the stop plate adjacent to each pin 1140 except the one farthest to the right an escapement or spacing pin 1142 adapted to engage an escapement dog 1143 (Fig. 5). The dog 1143 is guided for approximately vertical reciprocation alongside the stop lug 1141. When the escapement dog 1143 is in normal or upper position, it is in position to be pressed against the abutment 1006 by a pin 1142. A spring 1149 (Fig. 5) tends to move the dog 1143 to the right, that is to say, away from the abutment 1006 and against a stop 1150. When the main operating handle of the machine is pulled forward, the escapement dog 1143 is withdrawn downwardly, as described in my said application. As soon as the dog 1143 is below the pin 1142, the spring 1149 moves the dog into position below the pin 1142 and against the stop 1150. In the return stroke of the handle the dog 1143 is raised, thereby lifting the pin 1142 until the adjacent pin 1140 is above the stop lug 1141, whereupon the carriage moves to the left until the next pair of pins 1140 and 1142 stop against the lug 1141 and the dog 1143, respectively.

In order to permit of skipping columns, I provide means including a key 1151 carried by a lever 1152 which is pivoted at 1039 in the machine frame. To one arm of the lever 1152 is pivoted a link 1154 which in turn is pivoted to one arm of a lever 1155 mounted to swing on an axis 1146. To the other arm of the lever 1155 is pivoted an escapement dog 1156 which is guided for up and down movement alongside the dog 1143. A contractile spring 1157 normally holds the dog 1156 away from the abutment 1006 and against a stop 1158. 1159 is a contractile spring which normally holds the tabulator key 1151 elevated and the tabulator dog 1156 in its lower position. At desired points on the stop plate 1010 are tabulating pins 1160 which stand above the tabulator dog 1156 when the carriage is arrested by the engagement of a stop pin 1140 with the lug 1141. It will be seen that by depressing the tabulator key 1151 the operator may raise the tabulator dog 1156, thereby lifting the pin 1160 and thus raising the stop plate 1010 until the pin 1140 is above the stop lug 1141, whereupon the carriage moves to the left until arrested by the engagement of another pin 1140 with the stop lug 1141.

In order that columns may be skipped, I substitute for any desired pins 1160 a bar 1161, the length of which at least equals the length of the space to be skipped by the carriage. The left-hand or forward end of the bar 1161 is beveled, as at 1162. Said bar has a beveled forward end 1162 constituting a cam, and a dwell portion which is at least as long as the distance between the stops that define the columnar positions to be skipped. As indicated in Fig. 1 there are three check columns on the ledger sheet; consequently the dwell portion of the bar 1161 should be at least as long as the distance between stops defining the first and third check column positions. In practice the bar 1161 is made of such length that the forward end of the cam-end 1162 will drop upon the tabulator dog 1156 as soon as the foremost pin 1140 has escaped from the stop 1141. Thus there is no possibility of the extreme front end of the cam 1162 striking against the side of the tabulator dog 1156. Moreover, the distance through which the plate 1010 falls after escaping from the stop 1141 is less and therefore the distance through which the carriage-moving spring must raise the plate as the cam 1162 rides up the dog 1156 is less, thus lightening the load on the spring.

In Fig. 1 the first transverse row of stop pins may be assumed to indicate the old balance column position, the next three transverse rows of stop pins indicating check column positions, and the next transverse row of pins the deposit column position. If there are no checks to be entered, the operator, after setting up on the key board the digits representing the old balance, depresses the tabulator key 1151 and while holding it down pulls the handle or touches the motor bar, whereupon the machine performs a cycle of operations to accumulate and print the old balance. In the first part of said cycle, the the escapement dog 1143 is lowered and moved laterally into position beneath the first pin 1142. In the latter part of said cycle the escapement dog 1143 is raised, thus raising the stop plate 1010 until the first pin 1142 is above the stop 1141, whereupon the carriage-moving spring moves the carriage to the right. As soon as the carriage has moved far enough to the right to carry the pins 1140 and 1142 away from the stop 1141 and the escapement dog 1143, respectively, the stop plate 1010 drops until the cam end 1162 rests on the elevated tabulator dog 1156, the carriage continuing to move to the right, and the cam bar sliding over the elevated tabulator dog 1156 until all the check column positions have been passed, when the stop plate drops. When the pin 1140 defining the deposit column position strikes the stop 1141 the carriage is arrested.

It will be seen that when there are checks to be entered, the machine is operated in the usual manner, but that when there are no checks to be entered, the operator may depress and hold down the tabulator key 1151 and thus cause the carriage to jump to the deposit column position.

I claim as my invention:

1. In a cross tabulator, an elongated plate pivoted at its forward edge and having on its lower side stops defining successive columnar positions, an escapement for said plate, a cam bar on the lower side of said plate, said bar having a dwell portion extending across the space between the stops defining certain of said columnar positions, said bar also having a cam portion at its forward end extending close to the stop defining the next preceding position, and a manually operable tabulator dog arranged to be raised into position to engage with said cam portion whereby in the cross-tabulating movement of said plate said bar slides over said tabulator dog.

2. In a cross tabulator, an elongated plate pivoted at its forward edge and having on its lower side stops defining successive columnar positions, an escapement for said plate, a cam bar on the lower side of said plate, said bar having a dwell portion extending across the space between the stops defining a plurality of columnar positions, said bar also having a cam portion at its forward end, and a manually operable tabulator dog arranged to be raised into position to engage with said cam whereby in the cross-tabulating movement of said plate said bar slides over said tabulator dog.

3. In a cross-tabulator, a member having stops defining successive columnar positions, an escapement for said member, a cam bar on said member, said bar having a dwell portion extending across the space between the stops defining a plurality of columnar positions, said bar also having a cam portion at its forward end, and a manually operable tabulator dog arranged to be raised into position to engage with said cam whereby in the cross-tabulating movement of said member said bar slides over said tabulator dog.

4. In a cross-tabulator, a member having stops defining successive columnar positions, an escapement for said member, a bar on said member, said bar having a dwell portion extending across the face between stops defining a plurality of columnar positions, and manually operable means to lift said bar and thus free said member from the control of said escapement.

In testimony whereof, I have hereunto affixed my signature.

OSCAR J. SUNDSTRAND.